US012567899B2

(12) United States Patent
Sakamoto et al.

(10) Patent No.:    US 12,567,899 B2
(45) **Date of Patent:         *Mar. 3, 2026**

(54) WIRELESS COMMUNICATION APPARATUS AND WIRELESS COMMUNICATION METHOD

(71) Applicant: NTT, Inc., Tokyo (JP)

(72) Inventors: Kazumitsu Sakamoto, Musashino (JP); Yosuke Fujino, Musashino (JP); Yasuyoshi Kojima, Musashino (JP); Daisuke Goto, Musashino (JP); Kiyohiko Itokawa, Musashino (JP)

(73) Assignee: NTT, Inc., Tokyo (JP)

( * ) Notice: Subject to any disclaimer, the term of this patent is extended or adjusted under 35 U.S.C. 154(b) by 323 days.

This patent is subject to a terminal disclaimer.

(21) Appl. No.: 18/038,636

(22) PCT Filed: Dec. 2, 2020

(86) PCT No.: PCT/JP2020/044893
§ 371 (c)(1),
(2) Date: May 24, 2023

(87) PCT Pub. No.: WO2022/118403
PCT Pub. Date: Jun. 9, 2022

(65) Prior Publication Data
US 2024/0039622 A1     Feb. 1, 2024

(51) Int. Cl.
*H04B 7/185*          (2006.01)
(52) U.S. Cl.
CPC ................................ *H04B 7/18513* (2013.01)

(58) Field of Classification Search
None
See application file for complete search history.

(56) References Cited

U.S. PATENT DOCUMENTS 5,874,913 A * 2/1999 Blanchard ............ H04B 7/2125
455/12.1
10,826,599 B1 11/2020 Roy et al.
(Continued)

FOREIGN PATENT DOCUMENTS

JP          S55107356 A       8/1980

OTHER PUBLICATIONS

IEEE Std 802.11-2012, 9.3.3 Random backoff time, pp. 836-837, Mar. 2012.

*Primary Examiner* — Nicholas Sloms

(57) ABSTRACT

A wireless communication apparatus includes: a transmission control unit that determines an earlier transmission timing as an elevation angle of a relay apparatus when viewed from the own wireless communication apparatus is larger; and a transmission unit that transmits a wireless signal to the relay apparatus at the transmission timing. The wireless communication apparatus may further include a reception unit that acquires an upper limit value. The transmission control unit may derive a subtraction value, which is a variable value to be used for subtraction, as a larger value as the elevation angle is larger, may subtract the subtraction value from a backoff counter value which is derived based on the upper limit value and is equal to or larger than 0, and may determine, as the transmission timing, a timing at which the backoff counter value becomes equal to or smaller than 0.

6 Claims, 9 Drawing Sheets

(56)     References Cited

U.S. PATENT DOCUMENTS

| | | | |
|---|---|---|---|
| 12,401,977 B2 | 8/2025 | Qiao et al. | |
| 2008/0144493 A1* | 6/2008 | Yeh | H04W 74/0816 |
| | | | 370/230 |
| 2009/0213815 A1* | 8/2009 | Sherman | H04W 74/0841 |
| | | | 370/336 |
| 2015/0280812 A1* | 10/2015 | Jalali | H04B 7/18506 |
| | | | 455/431 |
| 2017/0202016 A1* | 7/2017 | Itagaki | H04W 74/0808 |
| 2017/0222712 A1 | 8/2017 | Chang | |
| 2017/0302368 A1 | 10/2017 | Trott | |
| 2018/0024250 A1* | 1/2018 | Nishi | G01S 19/23 |
| | | | 342/357.62 |
| 2018/0343052 A1 | 11/2018 | Lv et al. | |
| 2019/0090141 A1 | 3/2019 | Fujii | |
| 2021/0243622 A1 | 8/2021 | Tekgul et al. | |
| 2023/0067905 A1 | 3/2023 | Luo et al. | |
| 2023/0231596 A1 | 7/2023 | Goto et al. | |
| 2023/0403661 A1* | 12/2023 | Kim | H04W 56/001 |
| 2023/0413326 A1* | 12/2023 | Sakamoto | H04W 74/085 |
| 2024/0048206 A1 | 2/2024 | Goto et al. | |
| 2024/0048224 A1 | 2/2024 | Goto et al. | |

* cited by examiner

MOVEMENT

WIRELESS COMMUNICATION APPARATUS AND WIRELESS COMMUNICATION METHOD

CROSS-REFERENCE TO RELATED APPLICATIONS

This application is a 371 U.S. National Phase of International Application No. PCT/JP2020/044893, filed on Dec. 2, 2020. The entire disclosure of the above application is incorporated herein by reference.

TECHNICAL FIELD

The present invention relates to a wireless communication apparatus and a wireless communication method.

BACKGROUND ART

A wireless communication system that implements various applications by using an Internet of things (IoT) terminal station (IoT terminal) as a communication apparatus has become widespread. In such a wireless communication system, a plurality of terminal stations may be provided at locations at which a base station cannot be provided. Locations at which a base station cannot be provided include, for example, a buoy or a ship on the sea, or a mountain area.

The plurality of terminal stations generate environment information (for example, information of an air temperature, a room temperature, acceleration, or a light intensity) by using a sensor at each location where the terminal station is provided. The plurality of terminal stations transmit the generated environment information to a cloud-side apparatus by using a wireless signal. In this way, the cloud-side apparatus collects the environment information at a plurality of locations where a base station cannot be provided from the plurality of terminal stations.

In addition, as a wireless system suitable for terminal station communication, low power wide area (LPWA) is known. In LPWA, wide-area communication can be performed. In recent years, a communication satellite system (hereinafter, referred to as a "satellite IoT system") that collects data from terminal stations by using wireless communication such as LPWA has been studied. In the satellite IoT system, a low earth orbit satellite may be used as a communication satellite.

Here, the low earth orbit satellite that moves through the sky transmits, to a large number of terminal stations on the ground, a control signal (hereinafter, referred to as a "transmission permission signal") indicating that the terminal station is permitted to transmit a terminal uplink signal. In a case where the transmission permission signal is received, each terminal station transmits, as a terminal uplink signal, a wireless signal including data such as environment information to a low earth orbit satellite. In such a case, the terminal uplink signals are transmitted at the same timing, and as a result, the terminal uplink signals may collide with each other.

As a method for avoiding such a collision, it is effective to utilize a backoff algorithm in a carrier sense multiple access with collision avoidance (CSMA/CA) scheme (refer to Non Patent Document 1). The CSMA/CA scheme is a scheme adopted in a wireless LAN system standardized in IEEE 802.11.

Hereinafter, a variable to be used for subtraction of a backoff counter value is referred to as a "subtraction value".

The backoff counter value is updated by subtracting the subtraction value from the backoff counter value.

FIG. 10 is a diagram illustrating an example of a relationship between a location of a mobile relay station 20 with respect to each terminal station 30 and each variable value (each subtraction value) to be used for subtraction of the backoff counter value in the related art. Here, for example, an elevation angle of the mobile relay station 20 when viewed from the terminal station 30-5 is larger than an elevation angle of the mobile relay station 20 when viewed from the terminal station 3-M ("M" is an integer equal to or larger than 10).

In the CSMA/CA scheme, in a case where the terminal station receives the transmission permission signal, the terminal station 30 sets, as the backoff counter value, a random number which is uniformly distributed in a range from 0 to a contention window (CW), and subtracts the subtraction value from the backoff counter value for each unit time. The subtraction value (integer value) is 1. A value "1" described in each terminal station 30 illustrated in FIG. 10 represents each subtraction value.

The terminal station 30 transmits the terminal uplink signal 100 (wireless signal) to the low earth orbit satellite at a timing when the backoff counter value becomes 0. As a result, the transmission timings of a large number of terminal stations 30 are uniformly distributed, and thus a collision probability between the terminal uplink signals 100 can be reduced.

CITATION LIST

Non Patent Document

Non Patent Document 1: IEEE Std 802.11-2012, "9.3.3 Random backoff time", pp. 836-837, March 2012.

SUMMARY OF INVENTION

Technical Problem

A plurality of terminal uplink signals transmitted from a plurality of terminal stations arrive at a relay apparatus provided in a low earth orbit satellite from directions different from each other. Here, the relay apparatus controls directions of reception beams by using reception array antennas of the low earth orbit satellite. The relay apparatus separates the terminal uplink signals transmitted from the plurality of terminal stations at the same timing by controlling the directions of the reception beams.

Here, accuracy in separation of the terminal uplink signals transmitted from the terminal stations close to each other by the relay apparatus varies depending on the directions of the terminal uplink signals arrived at surfaces of the reception array antennas of the low earth orbit satellite. For example, in FIG. 10, the arrival directions of the terminal uplink signals are substantially the same. Thus, accuracy in separation of the terminal uplink signal 100-9 and the terminal uplink signal 100-M by the relay apparatus is lower than accuracy in separation of the terminal uplink signal 100-5 and the terminal uplink signal 100-7 by the relay apparatus. For this reason, in the transmission timing control disclosed in Non Patent Document 1, accuracy in separation of the terminal uplink signals by the relay apparatus is insufficient. In this way, accuracy in separation of the wireless signals received from the plurality of terminal stations may not be improved.

In view of the above circumstances, an object of the present invention is to provide a wireless communication apparatus and a wireless communication method capable of improving accuracy in separation of wireless signals received from a plurality of terminal stations.

Solution to Problem

According to an aspect of the present invention, there is provided a wireless communication apparatus including: a transmission control unit that determines an earlier transmission timing as an elevation angle of a relay apparatus when viewed from the own wireless communication apparatus is larger; and a transmission unit that transmits a wireless signal to the relay apparatus at the transmission timing.

According to another aspect of the present invention, there is provided a wireless communication method performed by a wireless communication apparatus, the method including: a transmission control step of determining an earlier transmission timing as an elevation angle of a relay apparatus when viewed from the own wireless communication apparatus is larger; and a transmission step of transmitting a wireless signal to the relay apparatus at the transmission timing.

Advantageous Effects of Invention

According to the present invention, it is possible to improve accuracy in separation of wireless signals received from a plurality of terminal stations.

DESCRIPTION OF EMBODIMENTS

Hereinafter, an embodiment of the present invention will be described in detail with reference to the drawings.

Figure 1:
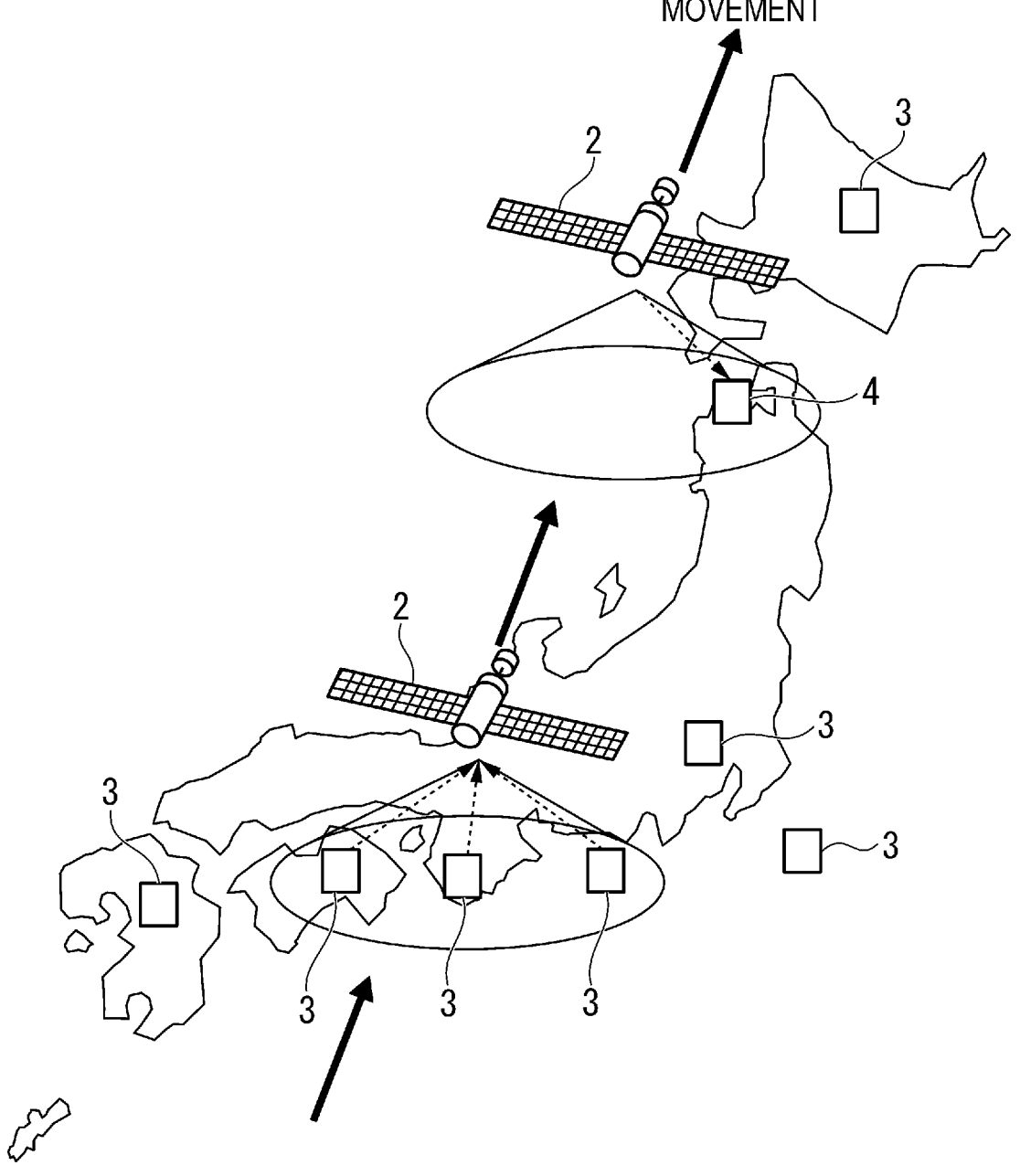
FIG. 1 is a diagram illustrating a schematic example of a wireless communication system according to an embodiment.

FIG. 1 is a diagram illustrating a configuration example of a wireless communication system 1 according to an embodiment. The wireless communication system 1 includes a mobile relay station 2, a terminal station 3, and a base station 4. In the wireless communication system 1, the number of each of the mobile relay station 2, the terminal station 3, and the base station 4 is arbitrary. Here, it is assumed that the number of the terminal stations 3 is large.

The wireless communication system 1 performs wireless communication of information for which immediacy is not required. Data such as environment information transmitted from each of a plurality of terminal stations 3 is collected by the base station 4 via the mobile relay station 2 (relay apparatus).

The mobile relay station 2 is provided on a moving object. The mobile relay station 2 moves in accordance with a movement of the moving object. An area (communication target area) in which the mobile relay station 2 can perform communication is determined according to a location of the moving object. The moving object is, for example, a low earth orbit (LEO) satellite or an unmanned aerial vehicle. An altitude of the LEO satellite is, for example, 2000 km or lower. The LEO satellite orbits the earth in approximately 1.5 hours per round.

In the wireless communication system 1, the mobile relay station 2 and the terminal station 3 perform wireless communication by using LPWA as an example. LPWA includes wireless communication such as LoRaWAN (registered trademark) and Sigfox (registered trademark). On the other hand, any wireless communication scheme can be used. Each terminal station 3 may transmit the same terminal uplink signal to the mobile relay station 2 a plurality of times in order to ensure communication reliability.

The mobile relay station 2 transmits a transmission permission signal indicating permission to transmit a terminal uplink signal (wireless signal from the terminal station to the mobile relay station) to the terminal station 3 in advance by using a terminal downlink signal (wireless signal from the mobile relay station to the terminal station).

The terminal downlink signal includes information of an upper limit value. The upper limit value is, for example, a value of a contention window. The upper limit value is determined, for example, as any one of (1) to (4) described below.

(1): The upper limit value is determined as a result value obtained by dividing the total number of the terminal stations 3 in a plurality of communication target areas through which the mobile relay station 2 passes in a predetermined period by a length of time required for the mobile relay station 2 to pass through the communication target areas (data collection target areas) in the predetermined period and for the mobile relay station 2 to collect data using a terminal uplink signal. The predetermined period is, for example, a period of the number of days for which the mobile relay station 2 orbits the earth.

As described above, the upper limit value in (1) is a result value obtained by dividing the total number of the terminal stations 3 in the plurality of communication target areas by the length of time during which the mobile relay station 2 passes through the plurality of communication target areas in the predetermined period.

(2): The upper limit value is determined as a result value obtained by dividing the total number of the terminal stations 3 (wireless communication apparatuses set as data collection targets) in the communication target area by a length of time during which the mobile relay station 2 passes through the communication target area.

As described above, the upper limit value in (2) is a result value obtained by dividing the total number of the terminal stations 3 in the communication target area by the length of time during which the mobile relay station 2 passes through the communication target area.

(3): The upper limit value is determined as a result value obtained by multiplying the number of separable terminal uplink signals (hereinafter, referred to as "separable number") among a plurality of terminal uplink signals which have simultaneously arrived at the mobile relay station 2 from each terminal station 3 uniformly distributed in a predetermined range (for example, a partial area of the communication target area) by a result value of the division in (1) or (2). The predetermined range is, for example, a range of approximately 20 degrees with respect to a front direction of a plurality of antennas 21 (array antennas). The separable number is determined in advance based on a prediction (simulation) of signal separation or an actual measurement result.

As described above, the upper limit value in (3) is a result value obtained by multiplying the number of separable wireless signals among a plurality of wireless signals which have simultaneously arrived at the mobile relay station 2 from each terminal station 3 uniformly distributed in the predetermined range of the communication target area by the result value of the division in (1) or (2).

(4): The upper limit value in (3) may be corrected according to an interference amount of an interference signal with respect to the terminal uplink signal. For example, the separable number of the terminal uplink signals (desired signals) is decreased due to an interference signal arriving from a predetermined communication station other than the terminal station 3 (for example, another terminal station using an IoT platform on the ground). Therefore, a value obtained by correcting the upper limit value in (3) by using the number decreased due to the interference signal is determined as a corrected upper limit value. For example, the corrected upper limit value is set as a larger value as the interference amount is larger.

As described above, the upper limit value in (4) is a value which is corrected according to the interference amount with respect to the wireless signal.

The terminal station 3 and the base station 4 are provided on the ground or on the sea. The terminal station 3 is, for example, an IoT terminal. The terminal stations 3 are provided, for example, at locations different from each other. The terminal station 3 collects data such as environment information that is detected using a sensor at a provided location.

The terminal station 3 adjusts a transmission timing (transmission frequency) of the terminal uplink signal to the mobile relay station 2 according to information of the upper limit value included in the terminal downlink signal and an elevation angle of the mobile relay station 2 when viewed from the terminal station 3. The terminal station 3 transmits the terminal uplink signal (wireless signal) including data such as environment information to the mobile relay station 2.

The mobile relay station 2 receives the terminal uplink signal transmitted from each of the plurality of terminal stations 3 while moving through the earth. The mobile relay station 2 receives the terminal uplink signal from each terminal station 3 within a coverage at a current location during movement.

Here, the mobile relay station 2 provided in the LEO satellite performs communication while moving at a high speed. For this reason, a time during which each terminal station 3 or the base station 4 can perform communication with the mobile relay station 2 is limited. In addition, wireless communication schemes of various specifications are used for the terminal stations 3. Therefore, the mobile relay station 2 stores waveform data of the received terminal uplink signal. That is, the mobile relay station 2 accumulates a reception waveform of the received wireless signal. The mobile relay station 2 transmits the accumulated reception waveform to the base station 4 by using a base station downlink signal at a timing at which communication with the base station 4 can be performed.

The base station 4 acquires, from the mobile relay station 2, the reception waveform of the terminal uplink signal in the mobile relay station 2. The base station 4 performs signal processing and decoding processing on the reception waveform transmitted from the terminal station 3 by using a base station downlink signal. Thereby, the base station 4 obtains data such as environment information that is transmitted from the terminal station 3.

Next, a configuration example of the wireless communication system 1 will be described.

Figure 2:
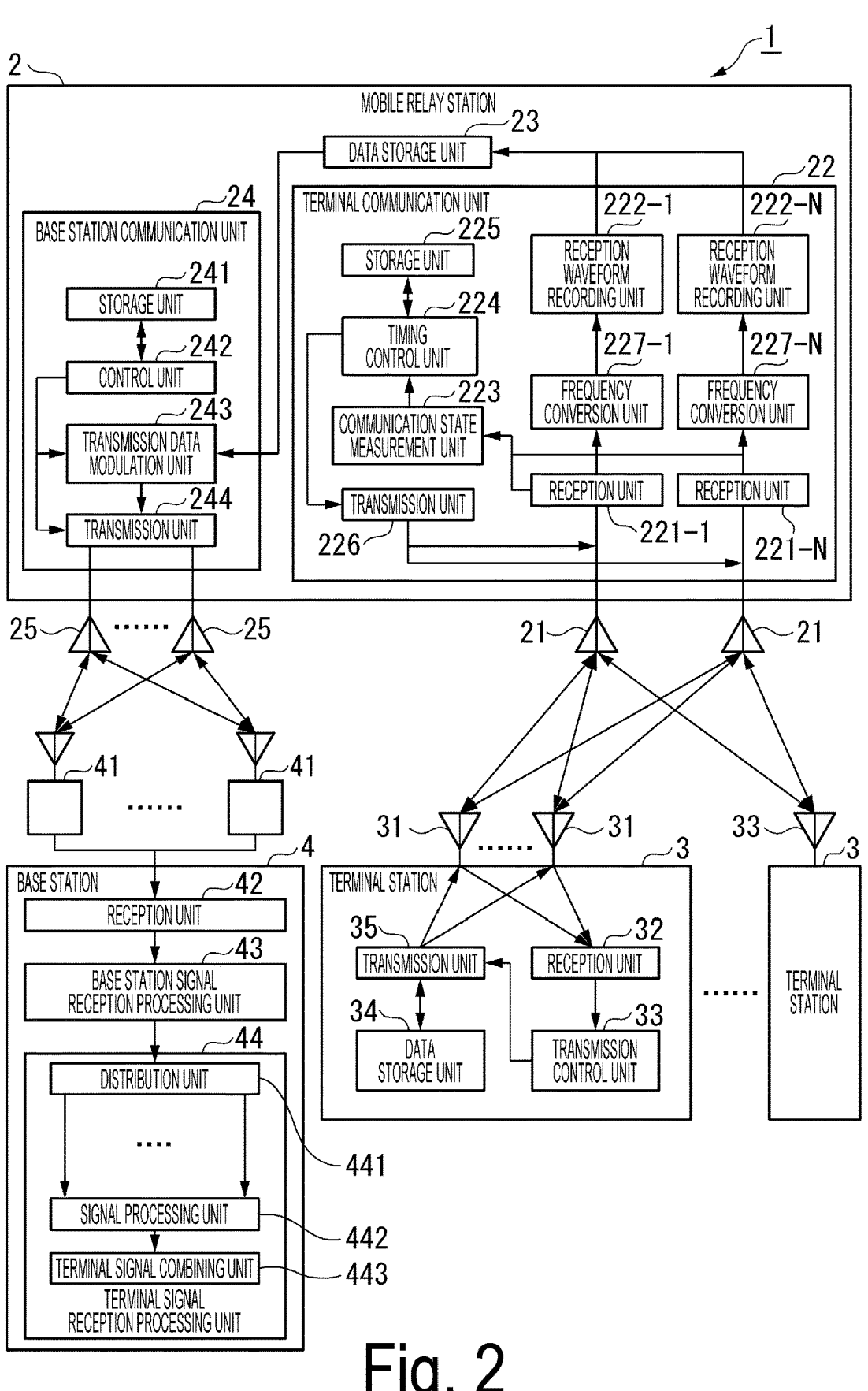
FIG. 2 is a diagram illustrating a configuration example of the wireless communication system according to the embodiment.

FIG. 2 is a diagram illustrating a configuration example of the wireless communication system 1 according to the embodiment. The mobile relay station 2 includes a plurality of antennas 21 (array antennas), a terminal communication unit 22, a data storage unit 23, a base station communication unit 24, and a plurality of antennas 25 (array antennas).

A configuration of the mobile relay station 2 will be described.

The terminal communication unit 22 includes a plurality of reception units 221, a plurality of reception waveform recording units 222, a communication state measurement unit 223, a timing control unit 224, a storage unit 225, a transmission unit 226, and a plurality of frequency conversion units 227.

The reception unit 221 receives a terminal uplink signal from each terminal station 3 within a coverage by multi input multi output (MIMO) communication using the plurality of antennas 21. The frequency conversion unit 227 performs, on a reception waveform (radio frequency (RF) signal) of the terminal uplink signal, frequency conversion using a quadrature demodulator or the like.

The reception waveform recording unit 222 performs sampling processing on a result obtained by performing frequency conversion on the reception waveform (RF signal) of the terminal uplink signal. The reception unit 221 generates waveform data representing a digital value obtained by the sampling processing.

In a case where the terminal station 3 transmits the terminal uplink signal a plurality of times for each of pieces of sensor data, a plurality of pieces of waveform data corresponding to the same terminal uplink signal may be generated.

The reception waveform recording unit 222 records, in the data storage unit 23, reception waveform information including reception timing information of the terminal uplink signal in the antenna 21 and the generated waveform data. The data storage unit 23 stores the reception waveform information.

The reception waveform recording unit 222 may select, for example, waveform data in a best reception state from the plurality of pieces of waveform data corresponding to the same terminal uplink signal. The reception waveform recording unit 222 may record, in the data storage unit 23, reception waveform information including reception timing information of the terminal uplink signal and the selected waveform data. The reception waveform recording unit 222 may record, in the data storage unit 23, reception waveform information including, for example, an average of the plurality of pieces of waveform data corresponding to the same terminal uplink signal.

The communication state measurement unit 223 measures a communication state of the terminal uplink signal which is transmitted from each of the plurality of terminal stations 3 and is received by the reception unit 221. The communication state is arbitrary information quantitatively indicating a degree of congestion of communication. For example, the communication state measurement unit 223 measures the number of the received terminal uplink signals per unit time that are received by the reception units 221. The communication state measurement unit 223 may measure an intensity of the reception signal that is in a frequency band of the terminal uplink signal and is received by the reception unit 221. The communication state measurement unit 223 outputs a measurement result of the communication state to the timing control unit 224.

The timing control unit 224 acquires a measurement result of the communication state from the communication state measurement unit 223. The timing control unit 224 generates information of the upper limit value based on the measurement result of the communication state. The timing control unit 224 generates a transmission permission signal including the information of the upper limit value. The timing control unit 224 controls a timing at which the terminal station 3 transmits a terminal uplink signal by using a terminal downlink signal including the transmission permission signal.

The storage unit 225 stores a transmission timing derived based on trajectory information of the mobile relay station 2. The transmission timing is, for example, a transmission timing of a terminal downlink signal. The timing control unit 224 can obtain a location, a velocity, and a movement direction of the mobile relay station 2 (LEO satellite) at a certain timing based on the trajectory information of the mobile relay station 2.

The storage unit 225 may store terminal identification information of the terminal station 3 and location information of the terminal station 3 in advance. The timing control unit 224 may determine the terminal station 3 (the terminal station 3 within the coverage) to be notified of the transmission permission signal based on the location of the mobile relay station 2 and the location of the terminal station 3. The timing control unit 224 may specify terminal identification information of the determined terminal station 3. The timing control unit 224 may include the specified terminal identification information in the transmission permission signal.

The transmission unit 226 acquires the terminal downlink signal generated by the timing control unit 224. The transmission unit 226 transmits the terminal downlink signal from one or more antennas 21. The terminal downlink signal includes the transmission permission signal and the information of the upper limit value. The transmission timing of the terminal downlink signal is controlled by the timing control unit 224 based on the trajectory information of the mobile relay station 2.

The base station communication unit 24 includes a storage unit 241, a control unit 242, a transmission data modulation unit 243, and a transmission unit 244.

The storage unit 241 stores a transmission timing derived based on the trajectory information of the mobile relay station 2 (LEO satellite). The transmission timing is, for example, a transmission timing of a base station downlink signal.

The control unit 242 controls the transmission data modulation unit 243 and the transmission unit 244 to transmit the reception waveform information to the base station 4 at the derived transmission timing. The transmission data modulation unit 243 reads, as transmission data, the reception waveform information from the data storage unit 23. The transmission data modulation unit 243 generates a base station downlink signal (electrical signal) by modulating the read transmission data. The transmission unit 244 converts the base station downlink signal (electrical signal) into a wireless signal. The plurality of antennas 25 transmit the base station downlink signal (wireless signal) to the base station 4.

A configuration of the terminal station 3 will be described.

The terminal station 3 includes a plurality of antennas 31, a reception unit 32 (receptor), a transmission control unit 33 (transmission controller), a data storage unit 34, and a transmission unit 35 (transmitter). The data storage unit 34 stores sensor data and the like.

The reception unit 32 receives the terminal downlink signal from the mobile relay station 2 by using one or more antennas 31.

The transmission control unit 33 extracts the transmission permission signal from the terminal downlink signal received by the reception unit 32. In a case where the transmission permission signal is extracted, the transmission control unit 33 extracts the information of the upper limit value from the transmission permission signal. As described above, the upper limit value is, for example, a value of the contention window.

The transmission control unit 33 derives a backoff counter value "x" based on the information of the upper limit value that is extracted from the transmission permission signal. An initial value of the backoff counter value "x" is a value equal to or larger than 0. For example, the transmission control unit 33 selects the backoff counter value "x" from among random number values uniformly distributed in a range in which the upper limit value included in the transmission permission signal is set as an upper limit value.

The transmission control unit 33 stores the trajectory information of the mobile relay station 2 in advance. The transmission control unit 33 derives an elevation angle of the mobile relay station 2 when viewed from the own terminal station 3 based on the trajectory information of the mobile relay station 2. For example, the transmission control unit 33 derives a subtraction value (countdown value) as a larger value as the elevation angle of the mobile relay station 2 when viewed from the own terminal station 3 is larger. The transmission control unit 33 subtracts the subtraction value from the backoff counter value "x" at a predetermined cycle. Thereby, the transmission control unit 33 updates the backoff counter value.

The transmission control unit 33 may acquire the terminal identification information included in the extracted transmission permission signal. In a case where the acquired terminal identification information is identification information associated with the own terminal station, the transmission control unit 33 may extract information of the upper limit value from the transmission permission signal. In a case where the acquired terminal identification information is not identification information associated with the own terminal station, the transmission control unit 33 may suspend transmission of the terminal uplink signal from the transmission unit 35 to the mobile relay station 2.

In a case where it is determined that the backoff counter value "x" is equal to or smaller than 0, the transmission unit 35 reads, as terminal transmission data, the sensor data from the data storage unit 34. The transmission unit 35 transmits a terminal uplink signal (wireless signal) including the read terminal transmission data from one or more antennas 31. The transmission unit 35 transmits the signal by using LPWA.

The transmission unit 35 determines a channel and a transmission timing to be used for transmission of the terminal uplink signal by the own terminal station by using a method determined in advance in a wireless communication scheme to be used. Further, the transmission unit 35 may form a transmission beam of the terminal uplink signal to be transmitted from one or more antennas 31 by a method determined in advance in a wireless communication scheme to be used.

The transmission unit 35 starts transmission of the terminal uplink signal. The transmission unit 35 reads, as terminal transmission data, the sensor data from the data storage unit 34. The transmission unit 35 transmits the terminal uplink signal including the read terminal transmission data from the antenna 31.

The transmission unit 35 may perform communication with a predetermined communication station (for example, another terminal station 3) by using a wireless scheme such as time division multiplexing or orthogonal frequency division multiplexing (OFDM).

A configuration of the base station 4 will be described.

The base station 4 includes a plurality of antenna stations 41, a reception unit 42, a base station signal reception processing unit 43, and a terminal signal reception processing unit 44.

The reception unit 42 converts the base station downlink signal received by using the plurality of antenna stations 41 into an electrical signal. The base station signal reception processing unit 43 obtains reception waveform information including waveform data and reception timing information by performing signal processing and decoding processing on the converted electrical signal. The base station signal reception processing unit 43 outputs the reception waveform information to the terminal signal reception processing unit 44.

The terminal signal reception processing unit 44 performs reception processing of the reception waveform information. The terminal signal reception processing unit 44 obtains data such as environment information (sensor data) that is transmitted from the terminal station 3 by using the terminal uplink signal by performing decoding processing on the waveform data included in the reception waveform information.

The terminal signal reception processing unit 44 includes a distribution unit 441, a signal processing unit 442, and a terminal signal decoding unit 443. The distribution unit 441 reads waveform data having the same reception timing from the reception waveform information. The distribution unit 441 outputs the read waveform data to the signal processing unit 442 according to an antenna identifier associated with the waveform data. That is, the distribution unit 441 outputs the waveform data associated with the antenna identifier of the antenna 21 to the signal processing unit 442.

The signal processing unit 442 performs, on the waveform data, processing such as frame detection (detection of the terminal uplink signal), doppler shift compensation, and offline beam control. The signal processing unit 442 outputs symbols obtained as a result of the processing, to the terminal signal decoding unit 443.

Here, the frame detection is processing of detecting a section including a signal (terminal transmission frame) transmitted from the terminal station from the waveform data. The off-line beam control is not reception beam control that is performed by the mobile relay station 2, but reception beam control in which waveform data recorded by the mobile relay station 2 is transmitted to the base station 4 and the base station 4 performs post-processing.

The terminal signal decoding unit 443 obtains terminal transmission data by performing decoding processing on the symbols.

Next, transmission control of the terminal uplink signal in each terminal station 3 will be described.

Figure 3:
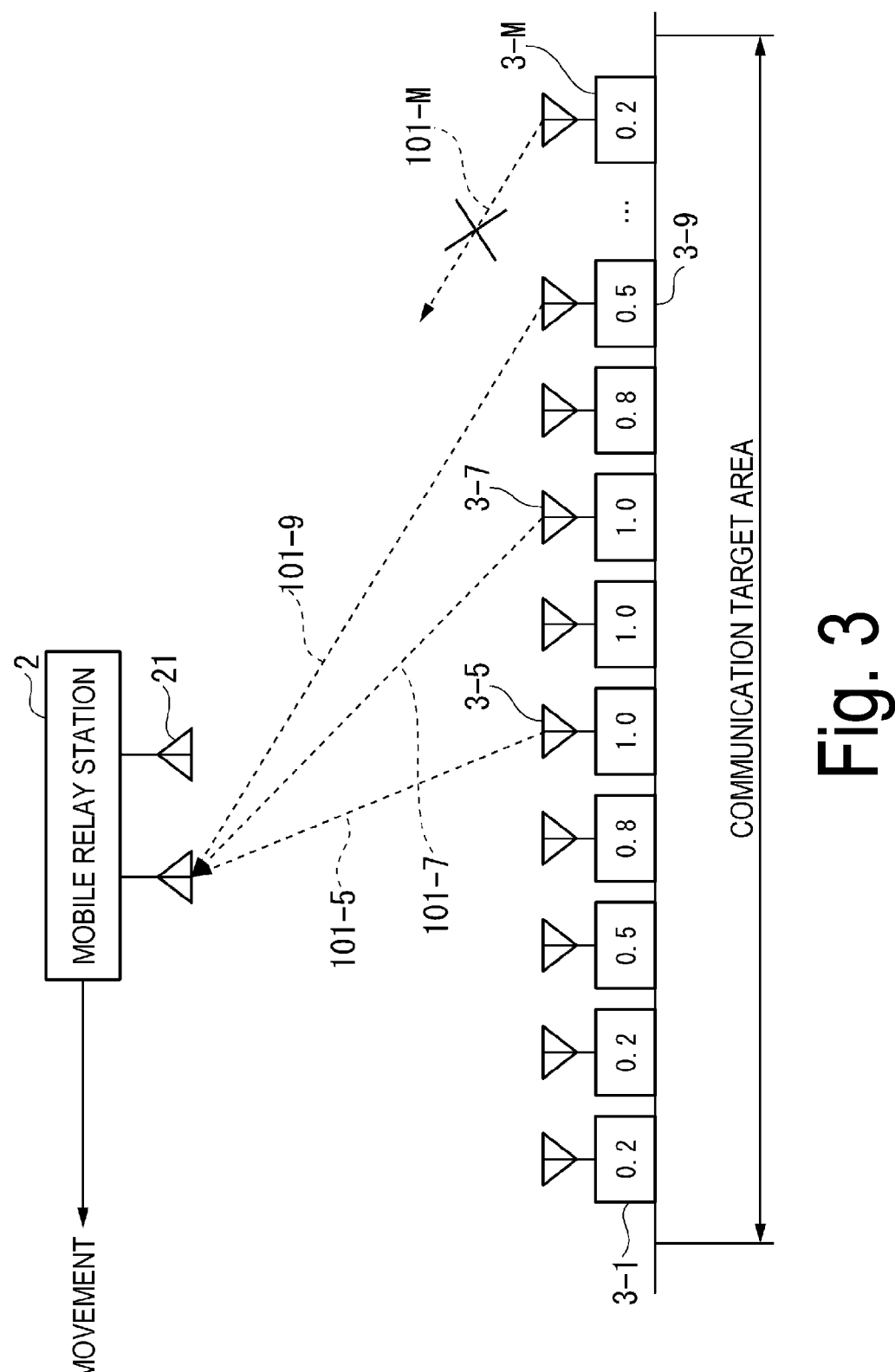
FIG. 3 is a diagram illustrating an example of a relationship between a location of a mobile relay station with respect to each terminal station and each variable value to be used for subtraction of a backoff counter value in the embodiment.

FIG. 3 is a diagram illustrating an example of a relationship between a location of the mobile relay station 2 with respect to each terminal station 3 and each variable value (each subtraction value) to be used for subtraction of the backoff counter value. In FIG. 3, the mobile relay station 2 is provided in a low earth orbit satellite that moves through the communication target area. The mobile relay station 2 transmits the transmission permission signal including information of the upper limit value toward the communication target area on the ground by using the terminal downlink signal.

In FIG. 3, M ("M" is an integer of one or more) terminal stations 3 are located in the communication target area. Here, for example, the elevation angle of the mobile relay station 2 when viewed from the terminal station 3-7 is larger than the elevation angle of the mobile relay station 2 when viewed from the terminal station 3-9. In addition, the elevation angle of the mobile relay station 2 when viewed from the terminal station 3-5 is larger than the elevation angle of the mobile relay station 2 when viewed from the terminal station 3-7.

In FIG. 3, the terminal station 3-5 transmits a terminal uplink signal 101-5 to the mobile relay station 2. The terminal station 3-7 transmits a terminal uplink signal 101-7 to the mobile relay station 2. The terminal station 3-9 transmits a terminal uplink signal 101-9 to the mobile relay station 2.

In general, as the elevation angle of the mobile relay station 2 when viewed from the terminal station 3 is larger, separation of the terminal uplink signals 101 transmitted from each terminal station 3 becomes easier. In FIG. 3, separation of the terminal uplink signal 101-5 and the terminal uplink signal 101-7 is easier than separation of the terminal uplink signal 101-7 and the terminal uplink signal 101-9.

For this reason, the transmission control unit 33 sets a transmission probability of the terminal uplink signal 101 to be higher as the elevation angle of the mobile relay station 2 when viewed from the terminal station 3 is larger. Thus, the transmission control unit 33 determines a subtraction value (countdown value) as a larger value as the elevation angle of the mobile relay station 2 is larger. The value described in each terminal station 3 illustrated in FIG. 3 represents an example of each subtraction value.

The subtraction value is, for example, a real value within a range of 0 to 1. For example, the subtraction value of the terminal station 3-5 is "1.0" as an example. For example, the subtraction value of the terminal station 3-7 is "1.0" as an example. For example, the subtraction value of the terminal station 3-9 is "0.5" as an example. For example, the subtraction value of the terminal station 3-M is "0.2" as an example. Thus, a transmission probability of the terminal uplink signal 101-M is lower than a transmission probability of the terminal uplink signal 101-9.

Figure 4:
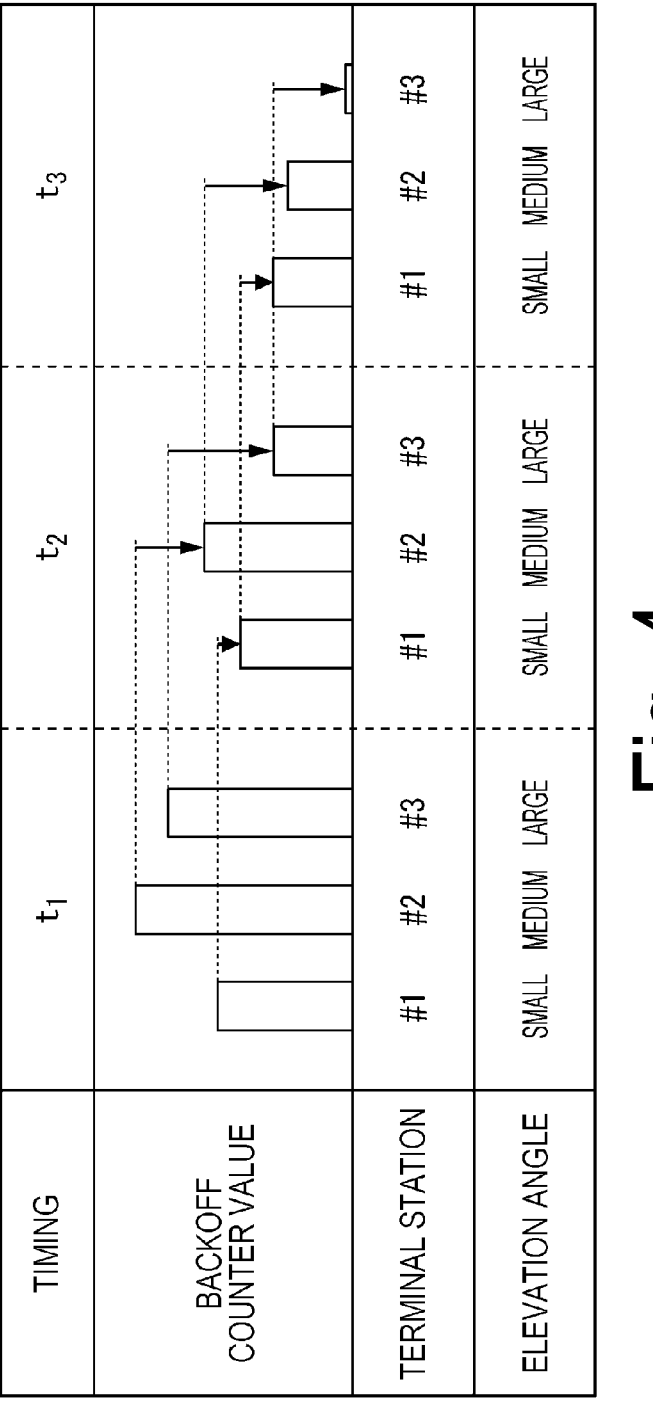
FIG. 4 is a diagram illustrating an example of a decreasing speed of the backoff counter value of each terminal station in the embodiment.

FIG. 4 is a diagram illustrating an example of a decreasing speed of the backoff counter value of each terminal station. In the terminal stations 3 having different elevation angles of the mobile relay station 2, the decreasing speeds of the backoff counter values are different from each other. For example, even in the terminal station 3 having a large backoff counter value determined using a random number, in a case where the elevation angle of the mobile relay station 2 when viewed from the terminal station 3 is large, the decreasing speed of the backoff counter value is fast, and thus the transmission probability of the terminal uplink signal 101 increases. That is, as the elevation angle of the mobile relay station 2 when viewed from the terminal station 3 is larger, the transmission probability of the terminal uplink signal 101 in the terminal station 3 is higher. In FIG. 4, in the terminal station 3 "#3" at a location where the elevation angle of the mobile relay station 2 is large, the transmission probability of the terminal uplink signal 101 is highest. In addition, in the terminal station 3 "#1" at a location where the elevation angle of the mobile relay station 2 is small, the transmission probability of the terminal uplink signal 101 is lowest.

Next, an operation example of the wireless communication system 1 will be described.

Figure 5:
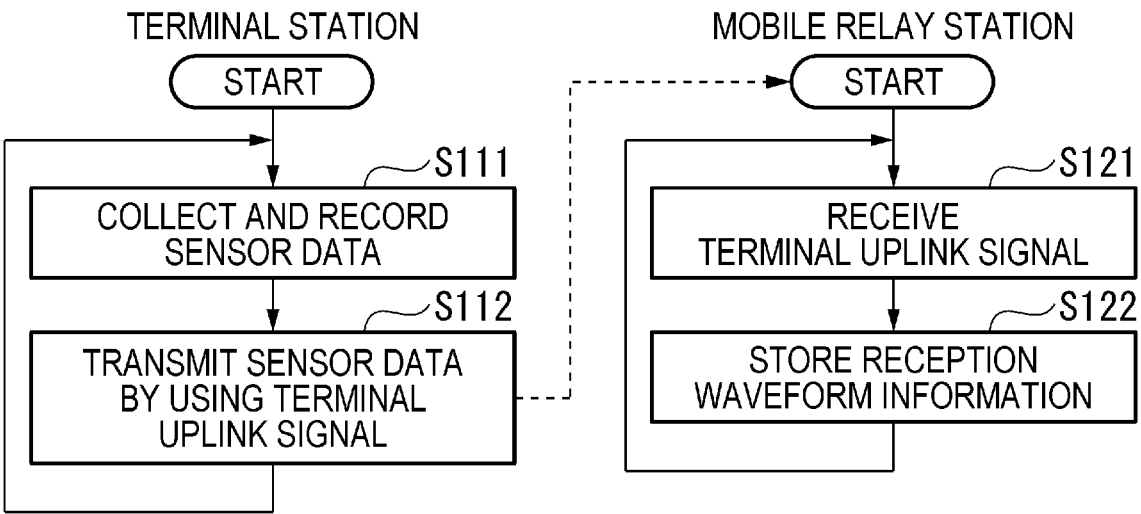
FIG. 5 is a flowchart illustrating data collection processing in the embodiment.

FIG. 5 is a flowchart illustrating data collection processing. In the terminal station 3, the sensor acquires sensor data (environment information) as necessary. The data storage unit 34 stores the acquired sensor data (step S111).

The transmission unit 35 acquires, as terminal transmission data, the sensor data from the data storage unit 34. The transmission unit 35 wirelessly transmits a terminal uplink signal including the terminal transmission data from the antenna 31 at a transmission timing derived by the transmission control unit 33 (step S112). The terminal station 3 repeats processing from step S111.

In the mobile relay station 2, the reception unit 221 receives the terminal uplink signal transmitted from the terminal station 3 (step S121). The reception waveform recording unit 222 records, in the data storage unit 23, reception waveform information in which waveform data representing a waveform of the terminal uplink signal and the reception timing information are associated with each other (step S122). The mobile relay station 2 repeats processing from step S121.

Figure 6:
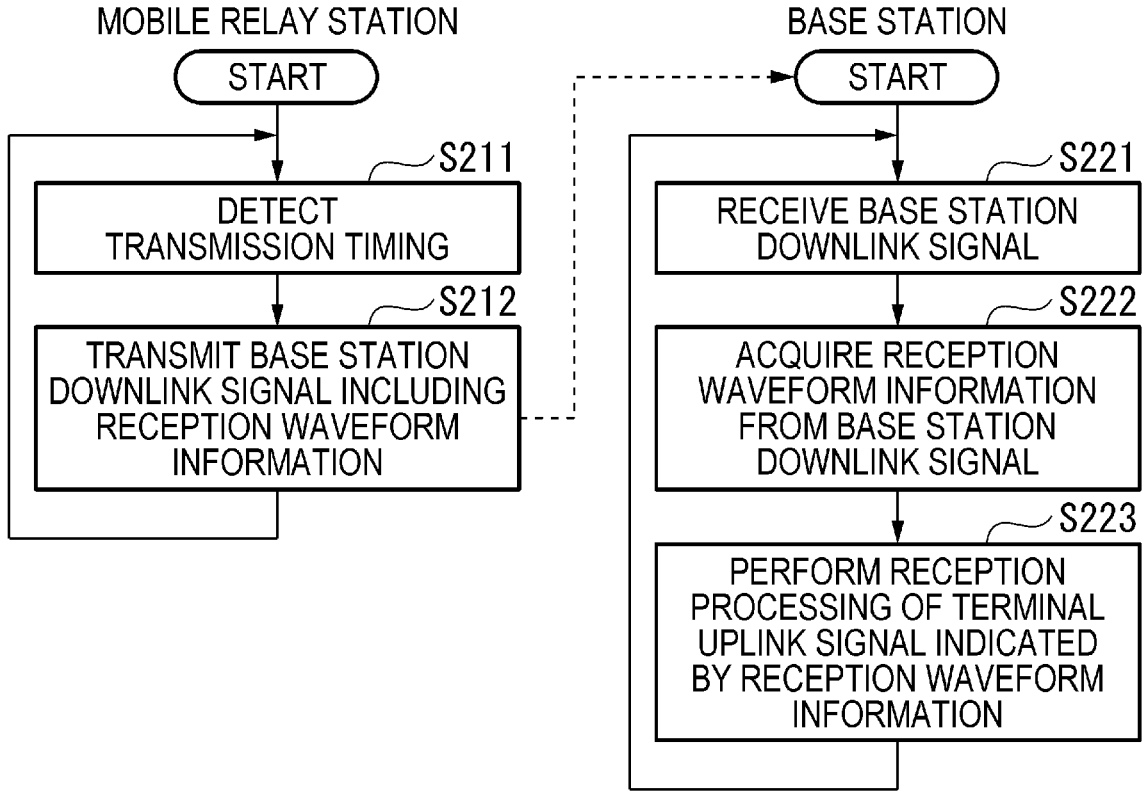
FIG. 6 is a flowchart illustrating downlink transmission control processing in the embodiment.

FIG. 6 is a flowchart illustrating downlink transmission control processing. In a case where the control unit 242 detects that the derived transmission timing is equal to the current timing, the control unit 242 instructs the transmission data modulation unit 243 and the transmission unit 244 to transmit the reception waveform information (step S211).

The transmission data modulation unit 243 reads, as transmission data, the reception waveform information stored in the data storage unit 23. The transmission data modulation unit 243 generates a base station downlink signal by modulating the read transmission data. The transmission unit 244 transmits the base station downlink signal (wireless signal) from the plurality of antennas 25 (step S212). The mobile relay station 2 repeats processing from step S211.

The antenna station 41 of the base station 4 receives the base station downlink signal from the mobile relay station 2

(step S221). The reception unit 42 converts the base station downlink signal received by the antenna station 41 into an electrical signal. The reception unit 42 outputs, as a reception signal, the converted electrical signal to the base station signal reception processing unit 43. The base station signal reception processing unit 43 performs signal processing and decoding processing on the reception signal. The base station signal reception processing unit 43 outputs reception waveform information obtained by the signal processing and the decoding processing to the terminal signal reception processing unit 44 (step S222).

The terminal signal reception processing unit 44 performs reception processing of the terminal uplink signal indicated by the reception waveform information. The terminal signal reception processing unit 44 obtains sensor data (environment information) transmitted from the terminal station 3 by performing decoding processing on the waveform data included in the reception waveform information (step S223). The base station 4 repeats processing from step S221.

Figure 7:
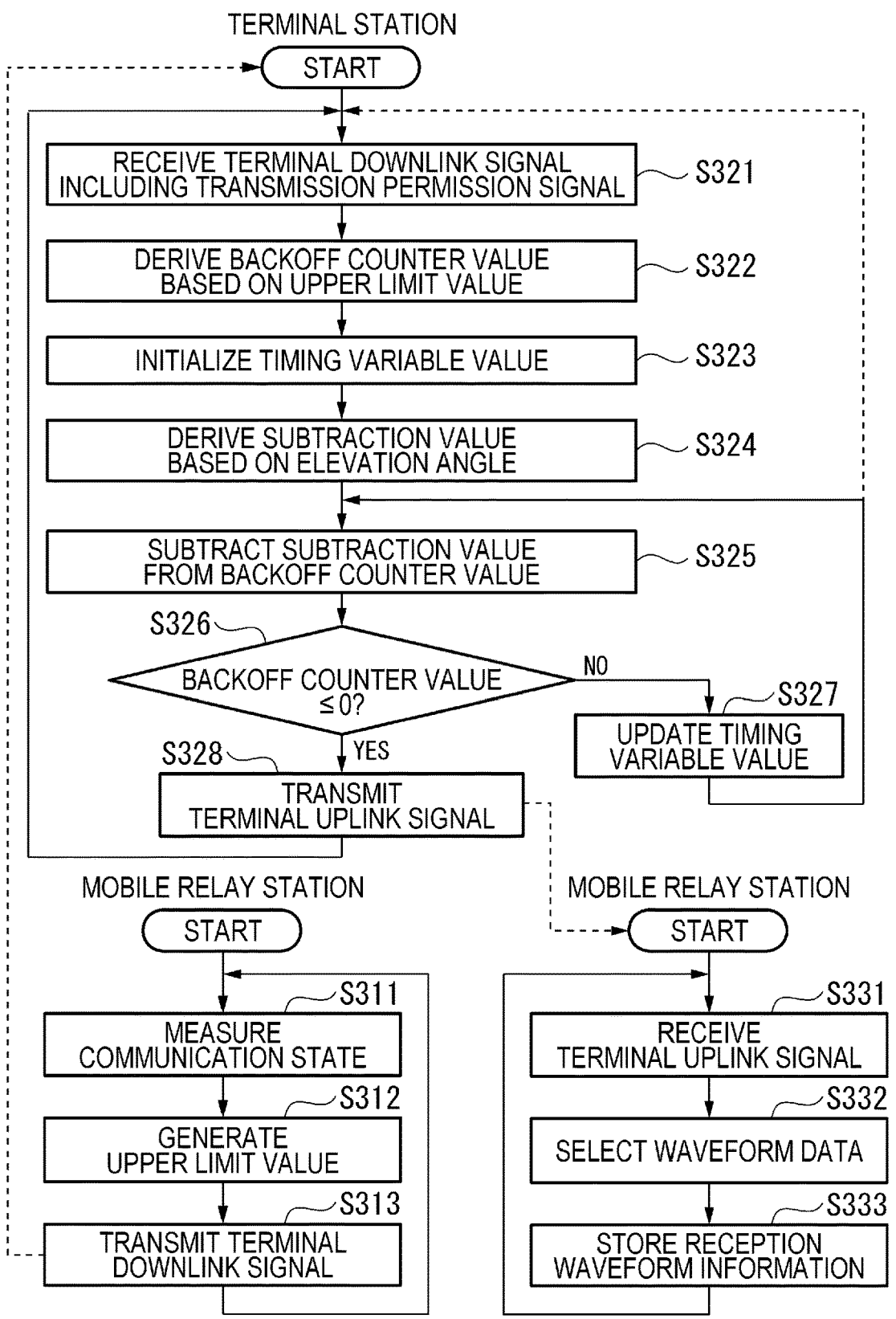
FIG. 7 is a flowchart illustrating an example of controlling a transmission timing of a terminal uplink signal in the embodiment.

FIG. 7 is a flowchart illustrating an example of controlling the transmission timing of the terminal uplink signal. In FIG. 7, step S328 corresponds to step S112 illustrated in FIG. 5. In FIG. 7, step S333 corresponds to step S122 illustrated in FIG. 5.

The communication state measurement unit 223 measures a communication state of the terminal uplink signal which is received by the reception unit 221 (step S311). The timing control unit 224 generates information of the upper limit value (for example, the value of the contention window) based on the communication state measured by the communication state measurement unit 223 (step S312).

The timing control unit 224 generates a transmission permission signal including the information of the upper limit value. The timing control unit 224 may generate a transmission permission signal including terminal identification information of the terminal station 3 to be notified of the transmission permission signal and the information of the upper limit value.

The transmission unit 226 acquires the transmission permission signal from the timing control unit 224. The transmission unit 226 transmits a terminal downlink signal including the transmission permission signal from the plurality of antennas 21 (step S313). The mobile relay station 2 repeats processing from step S311.

The reception unit 32 receives the terminal downlink signal including the transmission permission signal from the mobile relay station 2 via the antenna 31 (step S321). The transmission control unit 33 derives a backoff counter value "x" based on the upper limit value included in the transmission permission signal (step S322).

The transmission control unit 33 initializes a timing variable value "t" to "t=1" (step S323). The transmission control unit 33 derives a subtraction value (countdown value) as a larger value as the elevation angle of the mobile relay station 2 when viewed from the own terminal station 3 is larger (step S324). The transmission control unit 33 subtracts the subtraction value "CD" from the backoff counter value "x". Thereby, the transmission control unit 33 updates the backoff counter value to "x=x–CD" (step S325). As described above, as the elevation angle of the mobile relay station 2 when viewed from the terminal station 3 is larger, a countdown speed of the backoff counter value is faster.

The transmission control unit 33 determines whether or not the backoff counter value "x" is equal to or smaller than 0. The transmission control unit 33 may determine whether or not the backoff counter value is 0 (step S326). In a case where it is determined that the backoff counter value "x" is a positive value (No in step S326), the transmission control unit 33 updates the timing variable value "t" to "t+1" (step S327). The terminal station 3 returns to processing of step S325.

In a case where it is determined that the backoff counter value "x" is equal to or smaller than 0 (Yes in step S326), the transmission unit 35 reads, as terminal transmission data, the sensor data from the data storage unit 34. The transmission unit 35 transmits the terminal uplink signal including the read terminal transmission data from the antenna 31 (step S328). The terminal station 3 repeats processing from step S321.

The transmission control unit 33 may return to processing of step S326 to step S321 at a predetermined cycle. In this case, in step S322 subsequent to step S321, the backoff counter value may not be updated.

The reception unit 221 of the mobile relay station 2 receives the terminal uplink signal transmitted from the terminal station 3 by the antenna 21 a plurality of times (step S331). The reception waveform recording unit 222 performs sampling on the reception waveform of each of the plurality of terminal uplink signals received by the reception unit 221. The reception waveform recording unit 222 generates waveform data indicating values obtained by the sampling. The reception waveform recording unit 222 selects, for example, waveform data in a best reception state from the plurality of pieces of waveform data corresponding to the same terminal uplink signal (step S332).

The reception waveform recording unit 222 records, in the data storage unit 23, reception waveform information including reception timing information of the terminal uplink signal in the antenna 21 and the selected waveform data (step S333). The mobile relay station 2 repeats processing from step S331.

As described above, the transmission control unit 33 determines an earlier transmission timing as the elevation angle of the relay apparatus when viewed from the own wireless communication apparatus is larger. For example, in a case where the elevation angle of the mobile relay station 2 when viewed from the terminal station 3 is large, the decreasing speed of the backoff counter value is fast, and thus the transmission probability of the terminal uplink signal 101 increases. The transmission unit 35 transmits the terminal uplink signal to the mobile relay station 2 (relay apparatus) at a transmission timing.

Thereby, it is possible to improve accuracy in separation of the wireless signals received from the plurality of terminal stations 3. The efficiency in a case where the terminal station 3 is added can be improved. It is difficult to separate the terminal uplink signals which are simultaneously transmitted from the plurality of terminal stations 3 having small elevation angles of the mobile relay station 2. A probability that the terminal uplink signals are to be simultaneously transmitted is reduced, and thus a communication success rate can be improved.

A media access control (MAC) protocol for reducing a transmission probability of the terminal uplink signals in a state where the elevation angle of the mobile relay station 2 when viewed from the terminal station 3 is small can be implemented.

First Modification Example

In the embodiment, the mobile relay station 2 transmits the transmission permission signal and the information of the upper limit value to the terminal station 3 by using a terminal downlink signal. In a first modification example, the transmission permission signal and the information of the upper limit value are transmitted from an apparatus other than the mobile relay station 2 to the terminal station 3. That is, the transmission permission signal and the information of the upper limit value may be transmitted to the terminal station 3 by using a wireless signal or a wired signal other than a terminal downlink signal.

For example, a surrounding ground station (for example, another terminal station 3 or another base station 4) may transmit the transmission permission signal and the information of the upper limit value to a predetermined terminal station 3 by using a wireless signal.

Second Modification Example

The transmission control unit 33 of the terminal station 3 may not store trajectory information of the mobile relay station 2 in advance. For example, the timing control unit 224 of the mobile relay station 2 transmits a current location of the mobile relay station 2, information of a location advanced by a width (distance) of the communication target area in a movement direction from the current location, information of the timing, the transmission permission signal, and the upper limit value by using a terminal downlink signal.

The transmission control unit 33 of the terminal station 3 may derive an elevation angle of the mobile relay station 2 when viewed from the own terminal station 3 for each timing based on the current location of the mobile relay station 2, the information of the location advanced by the width (distance) of the communication target area in the movement direction from the current location, and the information of the timing. The transmission control unit 33 derives a subtraction value (countdown value) as a larger value as the elevation angle of the mobile relay station 2 when viewed from the own terminal station 3 is larger.

Instead of transmitting the information of the location advanced by the width of the communication target area and the information of the timing, the timing control unit 224 may transmit two line elements (TLE) of the mobile relay station 2 to the terminal station 3 by using a terminal downlink signal. The transmission control unit 33 of the terminal station 3 may derive the elevation angle of the mobile relay station 2 when viewed from the own terminal station for each timing based on the two line elements of the mobile relay station 2. The transmission control unit 33 derives a subtraction value as a larger value as the elevation angle of the mobile relay station 2 when viewed from the own terminal station 3 is larger.

Third Modification Example

Figure 8:
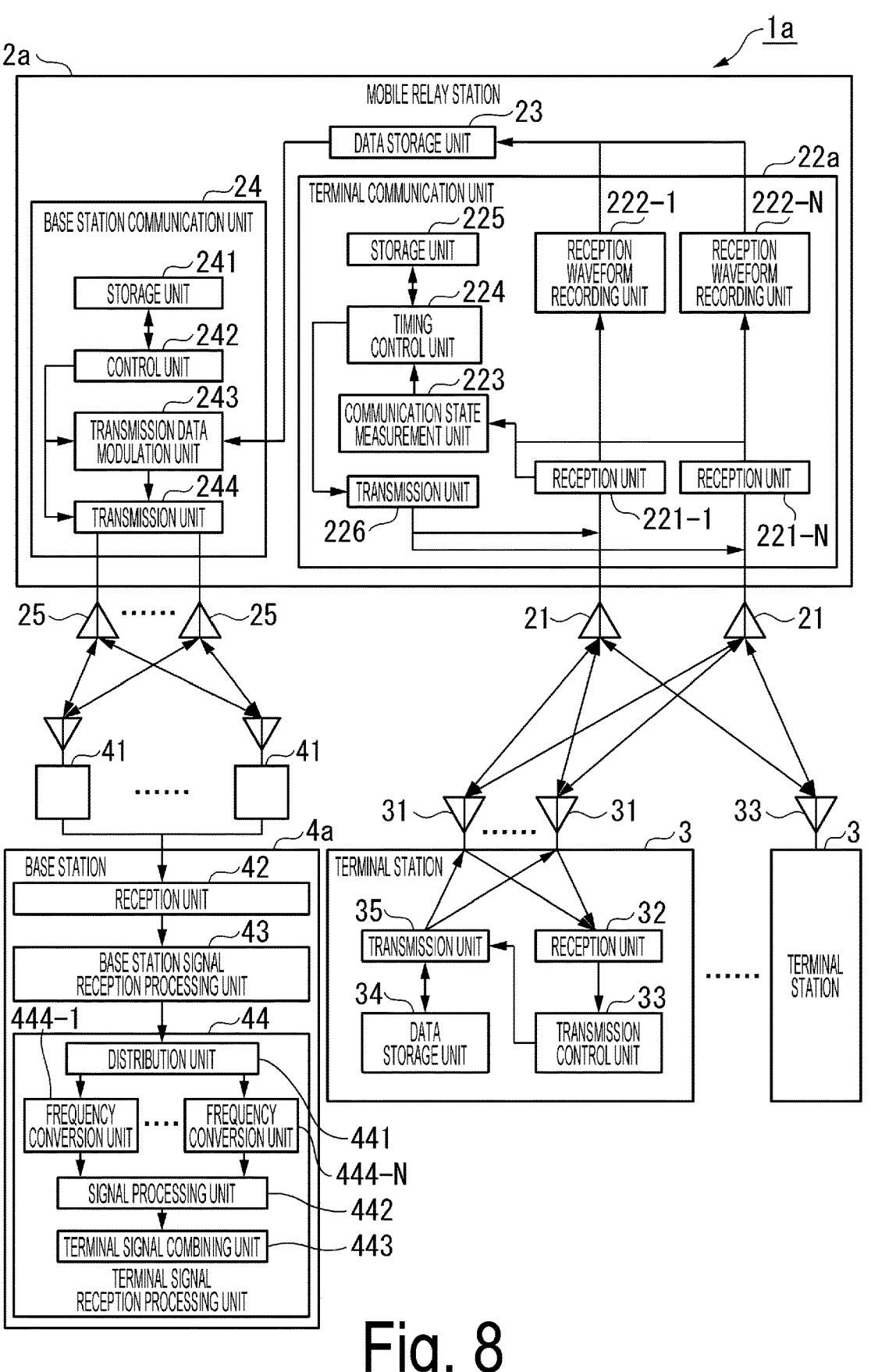
FIG. 8 is a diagram illustrating a configuration example of a wireless communication system according to a third modification example of the embodiment.

FIG. 8 is a diagram illustrating a configuration example of a wireless communication system 1a according to a third modification example of the embodiment. In the third modification example, the mobile relay station does not include frequency conversion units, and the base station includes frequency conversion units.

The wireless communication system 1a includes a mobile relay station 2a, a terminal station 3, and a base station 4a. The mobile relay station 2a includes a plurality of antennas 21 (array antennas), a terminal communication unit 22a, a data storage unit 23, a base station communication unit 24, and a plurality of antennas 25 (array antennas).

The terminal communication unit 22a includes a plurality of reception units 221, a plurality of reception waveform recording units 222, a communication state measurement unit 223, a timing control unit 224, a storage unit 225, and a transmission unit 226. The reception waveform recording unit 222 performs sampling processing on the reception waveform (RF signal) of the terminal uplink signal.

The base station 4a includes a plurality of antenna stations 41, a reception unit 42, a base station signal reception processing unit 43, and a terminal signal reception processing unit 44. The terminal signal reception processing unit 44 includes a distribution unit 441, a signal processing unit 442, a terminal signal decoding unit 443, and a plurality of frequency conversion units 444.

The distribution unit 441 reads waveform data having the same reception timing from the reception waveform information. The distribution unit 441 outputs the read waveform data to the signal processing unit 442 according to an antenna identifier associated with the waveform data. That is, the distribution unit 441 outputs the waveform data associated with the antenna identifier of the antenna 21 to the plurality of frequency conversion units 444.

The frequency conversion unit 444 performs, on the waveform data (RF signal) of the terminal uplink signal, frequency conversion using a quadrature demodulator or the like. The frequency conversion unit 444 outputs a result of the frequency conversion on the waveform data to the signal processing unit 442.

The signal processing unit 442 performs, on the result of the frequency conversion on the waveform data, processing such as frame detection (detection of the terminal uplink signal), doppler shift compensation, and offline beam control. The signal processing unit 442 outputs symbols obtained as a result of the processing such as frame detection, doppler shift compensation, and offline beam control to the terminal signal decoding unit 443.

In the embodiment and each modification example, a case where the moving object in which the mobile relay station is provided is a low earth orbit satellite (LEO satellite) has been described. On the other hand, the moving object may be another flight vehicle that flies through the sky, such as a geostationary satellite, a drone, or a HAPS.

In the embodiment and each modification example, the base station and the mobile relay station perform communication by MIMO. On the other hand, the present invention is not limited thereto, and at least one of the base station or the mobile relay station may perform communication by using one antenna.

According to the embodiment and each modification example, the wireless communication apparatus is the terminal station 3 in the embodiment, the relay apparatus is the mobile relay station 2 in the embodiment, and the base station apparatus is the base station 4 in the embodiment.

Figure 9:
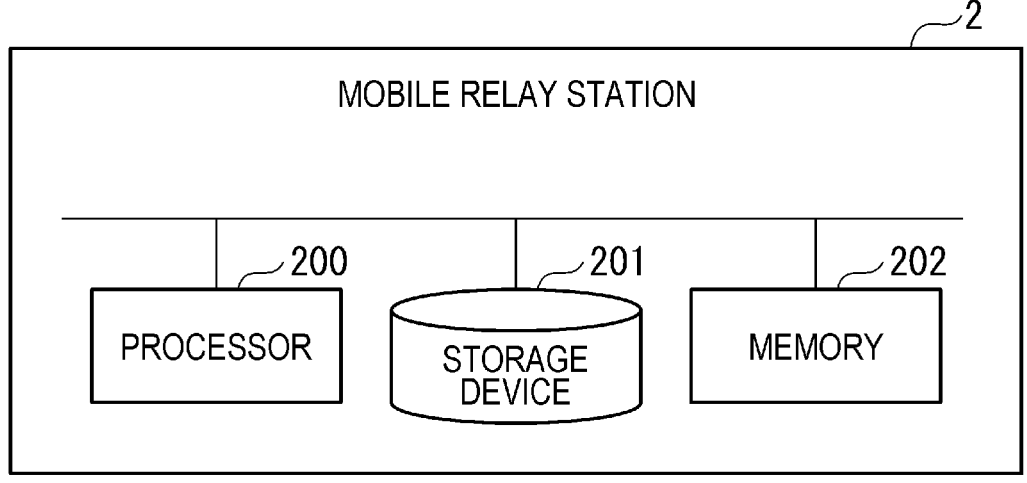
FIG. 9 is a diagram illustrating an example of a hardware configuration of a mobile relay station in the embodiment.
Figure 10:
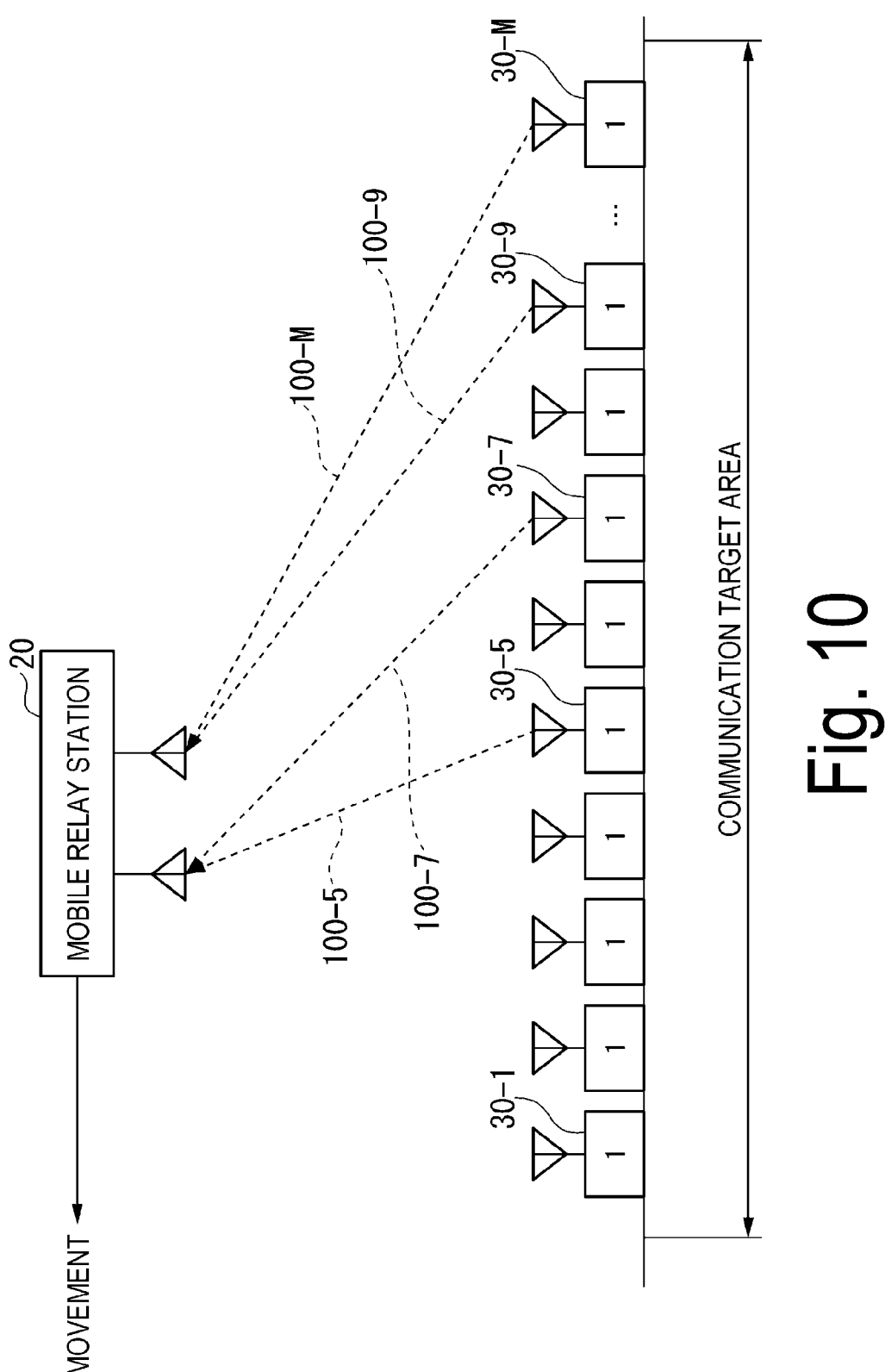
FIG. 10 is a diagram illustrating an example of a relationship between a location of a mobile relay station with respect to each terminal station and each variable value to be used for subtraction of a backoff counter value in the related art.

FIG. 9 is a diagram illustrating an example of a hardware configuration of the mobile relay station 2. In a case where a processor 200 such as a central processing unit (CPU) executes a program stored in a memory 202 including a nonvolatile recording medium (non-transitory recording medium), some or all of the functional units of the mobile relay station 2 are implemented as software. The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory recording medium such as a storage device 201 such as a hard disk included in a computer system. Some or all of the functional units of the mobile relay station 2 may be realized using hardware including an electronic circuit (electronic circuit or circuitry) in which, for example, a large scale integrated circuit (LSI), an application specific integrated circuit (ASIC), a programmable logic device (PLD), an FPGA, or the like is used.

Although the embodiment of the present invention has been described in detail with reference to the drawings, specific configurations are not limited to the embodiment. The present invention includes design and the like within a range without departing from the gist of the present invention.

REFERENCE SIGNS LIST

1 Wireless communication system
2 Mobile relay station
3 Terminal station
4 Base station
21 Antenna
22 Terminal communication unit
23 Data storage unit
24 Base station communication unit
25 Antenna
31 Antenna
32 Reception unit
33 Transmission control unit
34 Data storage unit
35 Transmission unit
41 Antenna station
42 Reception unit
43 Base station signal reception processing unit
44 Terminal signal reception processing unit
100 Terminal uplink signal
101 Terminal uplink signal
200 Processor
201 Storage device
202 Memory
221 Reception unit
222 Reception waveform recording unit
223 Communication state measurement unit
224 Timing control unit
225 Storage unit
226 Transmission unit
227 Frequency conversion unit
241 Storage unit
242 Control unit
243 Transmission data modulation unit
244 Transmission unit
41 Antenna station
42 Reception unit
43 Base station signal reception processing unit
44 Terminal signal reception processing unit
441 Distribution unit
442 Signal processing unit
443 Terminal signal decoding unit
444 Frequency conversion unit

The invention claimed is:

1. A wireless communication apparatus comprising:
a transmission controller that determines an transmission timing that is inversely proportional to an elevation angle of a relay apparatus when viewed from the own wireless communication apparatus;
a transmitter that transmits a wireless signal to the relay apparatus at the transmission timing; and
a receptor that acquires an upper limit value,
wherein the transmission controller derives a subtraction value, which is a variable value to be used for subtraction, is directly proportional to the elevation angle, subtracts the subtraction value from a backoff counter value which is derived based on the upper limit value and is equal to or larger than 0, and determines, as the transmission timing, a timing at which the backoff counter value becomes equal to or smaller than 0.

2. The wireless communication apparatus according to claim 1,
wherein the upper limit value is a result value obtained by dividing a total number of wireless communication apparatuses in a plurality of communication target areas by a length of a time during which the relay apparatus passes through the plurality of communication target areas in a predetermined period.

3. The wireless communication apparatus according to claim 1,
wherein the upper limit value is a result value obtained by dividing a total number of wireless communication apparatuses in a communication target area by a length of a time during which the relay apparatus passes through the communication target area.

4. The wireless communication apparatus according to claim 2,
wherein the upper limit value is a result value obtained by multiplying the number of separable wireless signals among a plurality of wireless signals which have simultaneously arrived at the relay apparatus from each wireless communication apparatus uniformly distributed in a predetermined range of the communication target area by a result value of the division.

5. The wireless communication apparatus according to claim 4,
wherein the upper limit value is a value corrected according to an interference amount with respect to the wireless signal.

6. A wireless communication method performed by a wireless communication apparatus, the method comprising:
determining an transmission timing that is inversely proportional to an elevation angle of a relay apparatus when viewed from the own wireless communication apparatus;
transmitting a wireless signal to the relay apparatus at the transmission timing; and
acquiring an upper limit value,
wherein determining the transmission timing comprises deriving a subtraction value, which is a variable value to be used for subtraction, is directly proportional to the elevation angle, subtracts the subtraction value from a backoff counter value which is derived based on the upper limit value and is equal to or larger than 0, and determines, as the transmission timing, a timing at which the backoff counter value becomes equal to or smaller than 0.

* * * * *